J. C. SCHOOLEY.
Refrigerator.
No. 17,588.
Patented June 16, 1857.
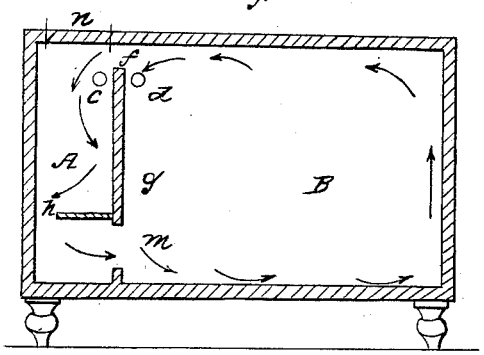
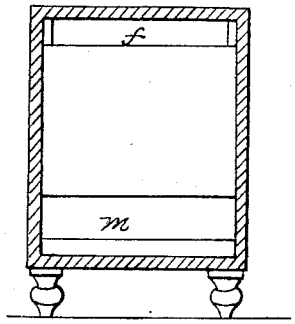
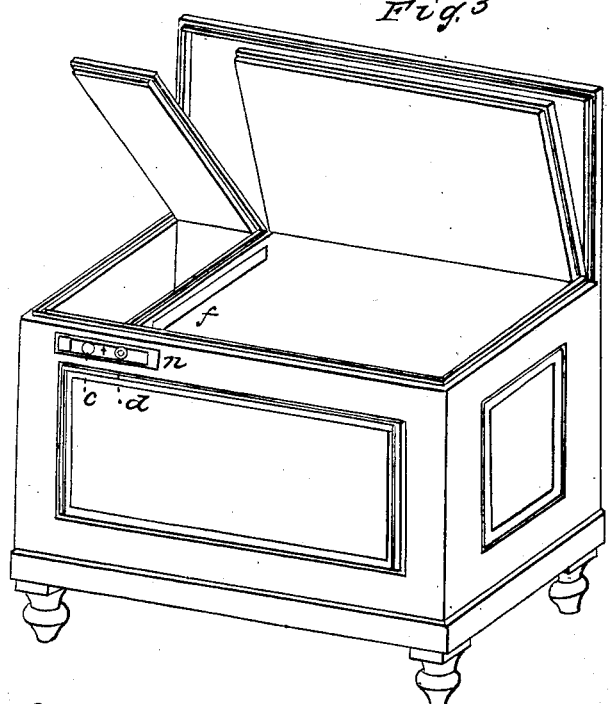
Witnesses
John C Hill
Saml S Fisher
Inventor
John C Schooley

UNITED STATES PATENT OFFICE.

JOHN C. SCHOOLEY, OF CINCINNATI, OHIO.

IMPROVEMENT IN REFRIGERATORS.

Specification forming part of Letters Patent No. 17,588, dated June 16, 1857.

*To all whom it may concern:*

Be it known that I, JOHN C. SCHOOLEY, of Cincinnati, in the county of Hamilton and State of Ohio, have invented a new and useful improvement in refrigerators, or ice or preserving rooms for the preservation of meats, provisions, fruits, vegetables, &c., from decomposition or the usual effects of warm and damp weather; and I do hereby declare that the same is fully described and represented in the following specification and accompanying drawings, letters, figures, and references thereof.

Figure 1 represents a longitudinal vertical and central section of my improved refrigerator. Fig. 2 represents a transverse sectional view of the partition separating the ice from the preserving-chamber, showing the openings in same. Fig. 3 represents a perspective view of the refrigerator, showing the ingress and egress air-openings with valves or registers to open or close at will.

The great difficulty heretofore found in all contrivances for the preservation of organic substances has been the want of proper ventilation, the presence of too much moisture, and the use of too great a quantity of ice to effect the purpose.

My refrigerator or preserving-room is cooled by a current of air and not by conduction. The air is impelled or led over ice in such a manner as to sufficiently cool it, and at the same time condense its moisture, and, being thus cooled, dried, &c., it flows into the preserving-chamber, and after refrigerating, ventilating, and desiccating the same it is either permitted to escape entirely from the refrigerator or to flow again onto the ice and rotate around the partition, and so on over the articles to be preserved.

I am aware that the external air after having been passed over ice has already been used for the ventilating and cooling of refrigerators or preserving-rooms, as described by Schooley's process, patented March 13, 1855, and other patents issued at a later date. I also am aware that the use and application of a continuous circulation of air entirely within a refrigerator has been used and patented by Thaddeus Fairbanks, of St. Johnsbury, Vermont, August 12, 1853, and assigned to John C. Schooley, of Cincinnati, Ohio. I being extensively engaged in the manufacturing of refrigerators, and being the exclusive possessor of both Schooley's and Fairbanks's rights for the United States, and having manufactured, sold, and used both descriptions, have found by practical experience that each is defective, as follows, viz: In using a current of air (as by Schooley's process) from the exterior and passing the same continually over the ice and out again into the external atmosphere too much ice is required to keep the chamber cool, and, besides, fresh dry air is passing out into the external atmosphere and lost which could otherwise be used again and again. In using a revolving current of air entirely within a close refrigerator, as in the one patented by Thaddeus Fairbanks, the temperature of the top and bottom of the preserving-apartment is becoming nearer and nearer to the same temperature every succeeding revolution the air makes, and after a very few revolutions an equilibrium is formed and the entire air contained in the refrigerator becomes of the same temperature. Consequently the circulation and rotation of the inclosed air entirely ceases and the preserving-chamber is nothing more nor less than an old-fashioned ice-chest. The moment that the inclosed air becomes still and the circulation ceases it becomes foul, and the inside of the preserving-chamber will be damp and musty unless a new supply of external atmosphere is admitted from time to time, when instantly the circulation commences and the refrigerator is again in operation.

I positively disclaim in my invention the use of either of the already-mentioned modes separately; but my improvement consists in combining the two together in such a manner and for the purpose of more properly and completely cooling, ventilating, desiccating, and purifying the preserving-apartment of any kind of a refrigerator, either portable or fixed, so that all kinds of organic substances can be preserved therein almost an indefinite length of time; also, to economize the use of ice and at the same time keep up such a circulation of air and at such times as to insure a complete ventilation and refrigeration, and the two modes are so combined and brought into action so that when the revolving air is in danger of forming an equilibrium and has nearly ceased to revolve the register admitting external atmosphere onto the ice and the register allowing the confined air to escape from the inside of the preserving-chamber are opened and closed at will by one movement from the outside in the following manner: The movable register (represented by letter $r$ in Fig. 3 of drawings) is constructed out of one piece of either wood or metal, with openings to correspond with the ingress and egress openings $c$ and $d$ in the refrigerator, and made to move forward and backward in a slide, so that when the register $r$ is moved in one direction the openings $c$ and $d$ are both closed, and when the register $r$ is moved back again the openings $c$ and $d$ are both uncovered, thus opening and closing the ingress and egress openings $c$ and $d$ by one movement of the register $r$. A small handle or knob is intended to be placed on the outside of the register $r$, so as to slide the register backward and forward with ease. The register $r$ in Fig. 3 of drawings is represented with its openings exactly over the openings $c$ and $d$.

To enable others to make and use my improvement, I will proceed to describe its construction and operation by reference to the accompanying drawings and the letters of reference marked thereon, forming part of this specification.

A and B in Fig. 1 represent the two apartment composing the refrigerator. A is the ice-chamber, and B the preserving-chamber.

$c$ is an opening covered with a movable register $r$ to admit outside atmosphere onto the ice. $d$ is a similar opening managed by the same register to allow the confined air to pass out of the preserving-chamber.

$f$ is an opening in the top of the partition $g$ to admit the warm air from the preserving-chamber onto the ice in the ice-chamber.

$h$ is a movable ice-floor to support the ice, and is made about one inch smaller at the sides than the width of the inside of the ice-chamber of a common-sized refrigerator.

$m$ is an opening at the bottom of the partition $g$ to allow the air after being dried, cooled, and purified to flow into the preserving-chamber.

The doors opening into my refrigerator are made either in the top or sides, as may be desired.

$n$ is a lid to the ice-chamber.

When ice is placed in the ice-chamber A, the register at $c$ and $d$ is opened, and when it is evident that a circulation of air is passing through the refrigerator and the preserving-chamber is sufficiently purified the register at $c$ and $d$ is closed and the ingress of outside atmosphere ceases and the circulation and rotation of air is kept up within the refrigerator; but when this circulation is about to cease or has ceased the register at $c$ and $d$ is again opened and the entire inside of the refrigerator is again purified, and so on.

I do not claim the use of an opening to admit external air onto ice, nor do I claim the use of an opening to allow said air to escape after having passed into the preserving-chamber. Neither do I claim the use of a partition between the ice and preserving-chamber with its openings above and below. I do not claim any of them separately; but What I do claim, and desire to secure by Letters Patent, is—

The employment of the double register $r$ and openings $c$ and $d$, in combination with the partition $g$ and the openings $f$ and $m$, the whole arranged and operated substantially in the manner and for the purposes set forth.

JOHN C. SCHOOLEY.

In presence of—
JOHN C. HILL,
SAML. S. FISHER.